Oct. 23, 1934.  S. BADANES  1,977,842
COUNTING AND CALCULATING DEVICE
Filed Nov. 18, 1932
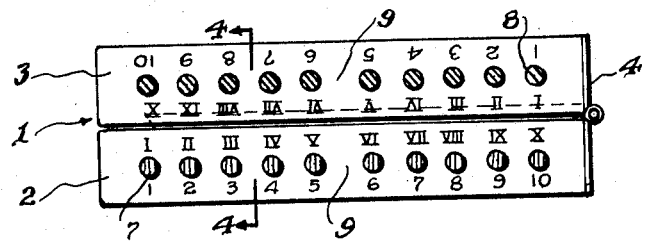
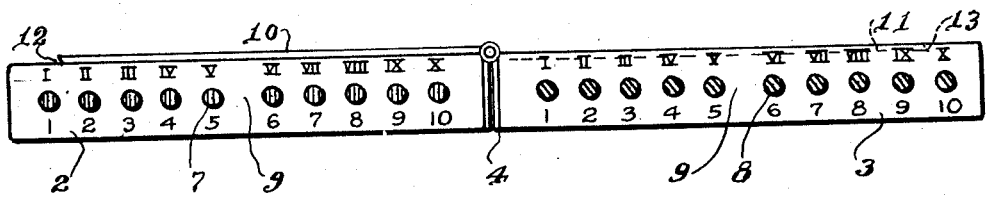
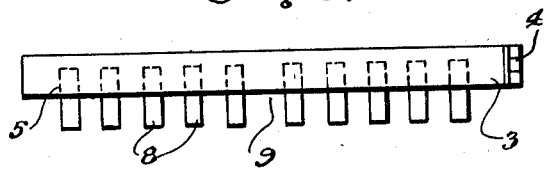
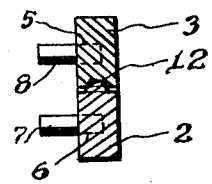
Inventor
Saul Badanes
By  J. Kaplan
       Attorney Patented Oct. 23, 1934

1,977,842

UNITED STATES PATENT OFFICE 1,977,842

COUNTING AND CALCULATING DEVICE

Saul Badanes, Brooklyn, N. Y.

Application November 18, 1932, Serial No. 643,253

6 Claims. (Cl. 35—2)

This invention relates to an education device to teach children to count and calculate from 1 to 20 with ease and certainty.

The general purpose of this device is to help the teacher carry out the initial steps of the learning process in arithmetic as a true educational process and not as a mere process of drilling children in fixed conclusions. The special purpose of the device is to help children learn to understand through their own self-activity the process of counting and calculating with numbers from 1 to 20.

I have found that the child at the beginning develops a number concept, at first forming its concept of one, then two, then three, etc., proceeding upward number by number. This concept is at first and best formed by establishing a connection between a quantity or a number of objects and the spaces or places the numbers occupy in a series. For instance, 5 occupies a larger place on the counting device than 3 or 4. Children get a clear picture of a number and see the number more vividly when they comprehend each single number as a member of a totality, and not as a mere isolated fact.

In developing the idea of number in the mind of the child, the dominating ideas should be first the group idea up to 5; secondly the idea of succession up to 10 without neglecting the help of the group idea; and lastly the idea of the decimal system without ignoring the group and succession ideas.

In constructing the counting device I had in mind an objective device that should help to develop these three attributes in the mind of the child.

The sliding cover and sliding pointer enable the child to see each dot in a row of ten as a separate and distinct unit or as part of a fixed totality of a row of ten. After considerable practice with this pointer and cover the child acquires a mental picture of the number scale as a linear series.

The counting device helps develop in the mind of the child the most important attribute of a number concept, namely, its serial nature. While the child is in the stage of learning to count from 1 to 10, a row of the counting device helps him to acquire a mental picture of the number scale. Children cannot calculate unless they have a mental picture of the number scale.

By means of the counting device I am able to provide a transitional stage between counting and calculating. I establish this connection between counting and calculating by adding and subtracting, first in single steps by means of ordinals.

This counting and calculating device helps the pupils understand the actual process of adding and subtracting. In working addition and subtraction with the help of of this device the pupil is able to recognize the problem, the solution or process of obtaining the answer. This is made possible by the removable pegs. With the help of the pegs the pupil is introduced to the plan of the structure of our decimal system. In this way he is taught to view 10 as a new unit for counting and calculating. The pegs help to separate and complete and compare every number from 1 to 10 and helps the child to understand and memorize all the addition and subtraction combinations.

The construction of the device has been guided by certain underlying features. The single units of the device are arranged into distinct and separate groups of five units each and the place of each unit from 1 to 10 can be perceived at a glance.

When the pupils first become acquainted with the counting device they become conscious of the above characteristics. The teacher helps the pupil in this way: She draws attention to the first group of the five pegs and points out the place of one group at the beginning and five at the end of the group. The teacher does the same with the second group. Constant practice in recognizing on the counting device each unit of the first ten at a glance will follow.

The counting device consists of two rows of ten removable pegs arranged on a hinged backing, each row of which is arranged into two distinctive and separate groups of five units or pegs. Each row of ten can be perceived at a glance and each row provides a reliable visual memory image. The advantage in using the counting device may be summed up as follows: First, it is a device for grouping the pegs in such a way that their total may be clearly recognized without counting. Second, this counting device, which is a distinct, concrete, linear series, is an important step in the development of the number scale in the abstract. Third, it helps the pupil to an insight into the actual process of calculation. One of its most important functions is to give to the pupil an insight into the meaning of the arithmetical operations of addition and substraction, hence its easily divisible and movable parts. Finally it introduces the pupil, by gradual steps to our decimal system, one of the main characteristics of which is the comprehension of ten definite units as one unit of a higher order. Thus the counting card helps the pupil at every stage where objective is needed.

The employment of the counting card is not only a help in developing number concepts, but is also indispensible in teaching addition and subtraction. The counting device is used solely as an instrument to help the pupil to think out the process and to get an insight into the process. Ultimately the pupils learn to get along without the counting card.

For a more general understanding of the invention, attention is now called to the drawing.

In the drawing:

Figure 1 is a front view of the counting and calculating device shown folded up.

Figure 2 is a view of the device shown in an extended position.

Figure 3 is a top view of the device as shown in Figure 1.

Figure 4 is a section on line 4—4 of Figure 1.

Figure 5 is a view of one of the pegs.

Referring now to the drawing in detail, numeral 1 designates the backing comprising two strips of light material such as wood 2 and 3 and hinged together at one end by the hinge 4. Cut in each of the strips are ten holes 5 and 6 adapted to hold removable pegs 7 and 8. The ten pegs or holes on each strip are divided into two groups of five each. The spaces 9 between each group of pegs is relatively wider than the other spaces between the pegs. One series of ten pegs is of a contrasting color to the other series of pegs. For instance, the pegs used on the strip 2 may be colored red and the pegs on strip 3 may be green.

Above and below each of the pegs in the series are roman and Arabic numerals from one to ten. Means are provided to keep the strips 2 and 3 in alignment when folded up as shown in Figure 1. Said means consists of a tongue 10 formed on the edge of strip 2 which fits in a groove 11 in strip 3. Also the outward end 12 of the tongue is slightly inclined inwardly and latches with the inclined end 13 of the groove. The hinge 2 is made of light material and has sufficient elasticity to be displaced slightly so that the end 12 of the tongue can enter or leave the inclined end 13 of the groove with very slight pressure. This is for the purpose of keeping the strips together when folded up as shown in Figure 1.

The pegs of each strip are supposed to represent the series of numbers 1 to 10. These numbers occupy a very important place in our decimal system of numeration because they are the elements of which higher numbers are composed. The art of calculation consists of breaking up the series and recombining some of its members, or in other words it consists of ascending and descending the number scale.

The use of the device may be begun by first pulling out all the pegs. The pupil is then taught to count, for instance by inserting first one peg representing the numeral 1. Then one or two additional pegs are inserted in the holes and the result added. After that a few more pegs may be inserted and the result learned. Likewise the pupil can learn subtraction by removing one or two pegs from a group and figuring up the result. The pupil may be taught to associate the pegs with other objects and various calculations of the said objects may be solved on the device. For instance, a question may be asked "A boy picked five apples from a tree and two pears from another tree. How many did he pick?" In solving this problem the pupil inserts five pegs in the first group of five holes and then inserts two pegs in the next group of holes and adds the result and obtains the answer 7.

In beginning to study numbers above 10, the pupil crosses the first threshold of the decimal system of enumeration. The pupil is here introduced to a new idea; namely, that of considering a series of ten units as a single group. The pupil is to learn that the contents of each number from now on is determined not only by its place in the series, but also by its place in our number system. This knowledge the pupil needs in order to be able to perform calculations with numbers above ten, especially with large numbers.

The pupil may be introduced to the second decade in two ways: (1) He may add successively 1 to each number, beginning with a ten, and in this way continue the number series beyond ten; 10 plus 1 equals 11, 11 plus 1 equals 12, 12 plus 1 equals 13, 13 plus 1 equals 14, etc. Counting is then still the mode of forming numbers. Or (2) he may consider ten as a higher unit and develop each new number of the second decade by adding successively to its collective unit, ten, every member of the primary series from 1 to 10; thus 10 plus 1 equals 11, 10 plus 2 equals 12, 10 plus 3 equals 13, 10 plus 4 equals 14, 10 plus 5 equals 15, 10 plus 6 equals 16, etc. The second method is by far preferable because the pupil must grasp the decimal composition of numbers. In the second way only, then, each new number from 11 to 20 is first conceived as possessing an attribute which the first ten cardinals lack; namely each number is made up of a decade and one or more units. That is the essence of the decimal system.

Here the counting device renders a valuable service. By means of the one-ten peg system of the device, the pupil comprehends numbers from ten to twenty, not only as of a series, but as a plurality made up of a ten and an already familiar number; 14 is not only 1 after 13, but it is also 10 plus 4. By means of the counting device, the pupil sees objectively the merging of the number scale and the decimal system of numeration into one.

In the same manner we use the counting card to help the pupil see that the basic operations are carried over to the second decade. For instance, we wish the pupil to see that 16 plus 3 equals 19, because 6 plus 3 equals 9. With the help of the counting device, the teacher shows the pupil that 16 is built from 10 and 6 units; therefore, in order to add 3 units to 16, we simply let the 6 units grow into 9 by adding to them 3 units, the ten-group remaining unchanged. Also by folding over the device as illustrated in Figure 1 the pupil sees that the ten pegs of the first decade equals the ten pegs of the second decade. The pupil must soon learn to transfer the basic operations thoughtfully and without any objective aids. The success of addition and subtraction within the higher decades depends on getting the pupil to work thoughtfully with the second decade rather than merely using objective aids to get answers without insight into the process of the transfer of basic operations.

It will thus be seen that I have provided an apparatus for a method of teaching children the thoughtful process of counting. The counting device is deliberately planned to help the pupil to remember the number scale with clearness and certainty. The pupil substitutes this number scale for the groups of concrete objects to be added or subtracted and thus takes an important step toward the power to perform the arithmetical process mentally, i. e., without the helps of objects. The counting card places in the hand of every pupil a concrete picture of the number scale. It is constructed so as to make each unit from 1 to 10 not only visible and movable but also visible at a glance. The exercises in separating, comparison, and completion further help the pupil to work conceptually with numbers.

Having described my invention, I claim:

1. A counting device comprising a pair of strips of the same corresponding dimensions, the edges of said strips being narrower than the width, a hinge connecting the strips together at one end whereby the strips may be swung into longitudinal alignment to each other and to parallel relation to each by meeting of the narrow edges of each strip, each strip having on its wide face a row of ten spaced holes, pegs adapted to be inserted in said holes, and means to latch the narrow edges of said strips together.

2. A counting device comprising a pair of strips of the same corresponding dimensions, the edges of said strips being narrower than the width, a hinge connecting the strips together at one end whereby the strips may be swung into longitudinal alignment to each other and to parallel relation to each other by the meeting of the narrow edges of each strip, each strip having on its wide face a row of ten spaced holes, pegs adapted to be inserted in said holes, one of said strips having a longitudinal tongue and the other of said strips having a longitudinal groove, said tongue adapted to enter said groove to keep said strips in alignment when folded together.

3. A counting device comprising a pair of strips of the same corresponding dimensions, the edges of said strips being narrower than the width, a hinge connecting the strips together at one end whereby the strips may be swung into longitudinal alignment to each other and to parallel relation to each other by the meeting of the narrow edges of each strip, each strip having on its wide face a row of ten spaced holes, pegs adapted to be inserted in said holes, one of said strips having a longitudinal tongue and the other of said strips having a longitudinal groove, said tongue adapted to enter said groove to keep said strips in alignment when folded together, and means to latch said strips together.

4. A counting device comprising a pair of strips of the same corresponding dimensions, the edges of said strips being narrower than the width, a hinge connecting the strips together at one end whereby the strips may be swung into longitudinal alignment to each other and to parallel relation to each other by the meeting of the narrow edges of each strip, each strip having on its wide face a row of ten spaced holes, pegs adapted to be inserted in said holes, one of said strips having a longitudinal tongue and the other of said strips having a longitudinal groove, said tongue adapted to enter said groove to keep said strips in alignment when folded together, the face of the outward end of said tongue being inclined, the end of said groove being inclined to match the inclined end of said tongue, so that the strips can be latched together by slightly displacing said hinge and causing the inclined ends of said tongue and groove to come together.

5. In a counting device for teaching children to count comprising a pair of strips of the same corresponding dimensions, placed edge to edge, the width of said strips being greater than the thickness, a hinge at one end of said strips hinging said strips together, the pintle of said hinge being on line with the meeting surface of said strips, a series of ten pegs arranged in two groups protruding from each of said strips, said pegs being opposite each other, and numerals above and below each peg, the numeral of the upper row being in reverse direction to the numerals of the lower pegs.

6. In a counting device for teaching children to count comprising a pair of strips of the same corresponding dimensions, placed edge to edge the width of said strips being greater than the thickness, a hinge at one end of said strips hinging said strips together, the pintle of said hinge being substantially on line with the meeting surface of said strips, a series of ten pegs arranged in two groups protruding from each of said strips, said pegs being opposite each other and numerals above and below each peg.

SAUL BADANES.